United States Patent
Koral et al.

(10) Patent No.: US 11,595,308 B2
(45) Date of Patent: Feb. 28, 2023

(54) CLOSED LOOP PREFIX MANAGEMENT AND CONTROLLER FOR WHITEBOXES

(71) Applicant: AT&T Intellectual Property I, L.P., Atlanta, GA (US)

(72) Inventors: Yaron Koral, Cherry Hill, NJ (US); Steven A. Monetti, Mountain Lakes, NJ (US); Han Nguyen, Marlboro, NJ (US); Kathleen Meier-Hellstern, Cranbury, NJ (US); Richard Koch, Tinton Falls, NJ (US); Simon Tse, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 330 days.

(21) Appl. No.: 16/440,185

(22) Filed: Jun. 13, 2019

(65) Prior Publication Data
US 2020/0396163 A1     Dec. 17, 2020

(51) Int. Cl.
*H04L 47/11*     (2022.01)
*H04L 43/0876*   (2022.01)

(52) U.S. Cl.
CPC .......... *H04L 47/11* (2013.01); *H04L 43/0876* (2013.01)

(58) Field of Classification Search
CPC .............................. H04L 47/11; H04L 43/0876
See application file for complete search history.

(56) References Cited

U.S. PATENT DOCUMENTS

| | | | | |
|---|---|---|---|---|
| 9,722,928 | B2 * | 8/2017 | Patel | H04L 45/04 |
| 10,505,809 | B1 * | 12/2019 | Sinn | H04L 41/082 |
| 10,623,322 | B1 * | 4/2020 | Nallamothu | H04L 45/64 |
| 10,652,115 | B1 * | 5/2020 | Chen | H04L 43/024 |
| 2002/0075813 | A1 * | 6/2002 | Baldonado | H04L 45/124 370/238.1 |
| 2005/0111367 | A1 * | 5/2005 | Jonathan Chao et al. | H04L 63/1408 370/235 |
| 2005/0232230 | A1 * | 10/2005 | Nagami | H04L 41/22 370/351 |
| 2007/0047550 | A1 * | 3/2007 | Takayama | H04L 61/5092 370/392 |
| 2008/0028467 | A1 * | 1/2008 | Kommareddy | H04L 63/1458 726/23 |
| 2009/0006647 | A1 * | 1/2009 | Balonado | H04L 47/10 709/238 |
| 2009/0122697 | A1 * | 5/2009 | Madhyasha | H04L 43/50 370/229 |

(Continued)

FOREIGN PATENT DOCUMENTS

EP     2955904 A1 * 12/2015     ......... H04L 61/2092

*Primary Examiner* — Mehmood B. Khan
(74) *Attorney, Agent, or Firm* — Guntin & Gust, PLC; Jay Anderson

(57) ABSTRACT

A system for closed loop prefix management for white boxes includes a network device, a route reflector coupled to the network device, a software defined network controller coupled to the route reflector and the network device, and a prefix usage analyzer in the software defined network controller. The prefix usage analyzer determines usage attributes of prefixes and identifies the prefixes with a predetermined usage attribute. The software defined network controller instructs a network controller in the network device to store the prefixes with the predetermined usage attributes in a table in the network device.

20 Claims, 5 Drawing Sheets

(56) References Cited

U.S. PATENT DOCUMENTS

| | | | | |
|---|---|---|---|---|
| 2012/0260337 | A1* | 10/2012 | Van der Merwe | H04L 69/22 |
| | | | | 726/22 |
| 2013/0282897 | A1* | 10/2013 | Siegel | H04L 45/02 |
| | | | | 709/224 |
| 2015/0029864 | A1* | 1/2015 | Raileanu | H04L 47/122 |
| | | | | 370/237 |
| 2015/0207712 | A1* | 7/2015 | Fang | H04L 43/0852 |
| | | | | 370/252 |
| 2016/0014028 | A1* | 1/2016 | He | H04L 45/745 |
| | | | | 370/392 |
| 2016/0218917 | A1* | 7/2016 | Zhang | H04L 45/42 |
| 2016/0218971 | A1* | 7/2016 | Basunov | H04L 45/04 |
| 2016/0359699 | A1* | 12/2016 | Gandham | G06F 16/248 |
| 2017/0195186 | A1* | 7/2017 | Zheng | H04L 41/342 |
| 2017/0366461 | A1* | 12/2017 | Wu | H04L 45/50 |
| 2018/0026895 | A1* | 1/2018 | Wang | H04L 41/0893 |
| | | | | 370/235 |
| 2018/0103128 | A1* | 4/2018 | Muscariello | H04L 45/306 |
| 2018/0205634 | A1* | 7/2018 | Avci | H04L 45/24 |
| 2019/0053104 | A1* | 2/2019 | Qiao | H04W 28/24 |
| 2019/0373073 | A1* | 12/2019 | John | H04L 61/457 |
| 2020/0092327 | A1* | 3/2020 | Adams | G06K 9/6267 |
| 2020/0336420 | A1* | 10/2020 | Joshi | H04L 45/02 |
| 2021/0036987 | A1* | 2/2021 | Mishra | H04L 61/5007 |
| 2021/0083975 | A1* | 3/2021 | Chunduri | H04L 45/34 |
| 2021/0112486 | A1* | 4/2021 | Ke | H04W 76/30 |

* cited by examiner

CLOSED LOOP PREFIX MANAGEMENT AND CONTROLLER FOR WHITEBOXES

TECHNICAL FIELD

The present disclosure relates to network routing. More particularly, the disclosure relates to a method, system, and computer program for managing routing prefixes for white box routers.

BACKGROUND

A "white-box" is a router that uses general-purpose processors and other off-the-shelf components, such as application-specific standard products (ASSPs). Rather than have custom application-specific integrated circuits customized for routing network traffic, white-box routers include software modules configured to form a control plane to make routing decisions and perform network management, while the underlying commodity hardware functions as the data plane (forwarding plane).

The control plane is the component to a router that focuses on how that one individual box interacts with its neighbors with state exchange. The Routing Information (data)Base (RIB) and Label Information Base (LIB) are processed in software and used to populate the forwarding information base (FIB) and the Label Forwarding Information Base (LFIB).

All routers maintain in memory a forwarding table, which consists of a list of internet protocol (IP) prefixes that corresponds to the destination IP address, according to which they decide where to forward each incoming packet. This memory is considered a significant factor in the white box router costs. In practice the forwarding table memory of white box network equipment uses two or more levels of memory, where the faster memory is limited and is more expensive than the slower memory levels.

One of the more expensive elements that affects a router cost is the size of the memory allocated to the forwarding table. This forwarding table contains a long list of IP address prefixes according to which the router determines to which egress port each packet should be forwarded to. Over time the number of prefixes grows as subnets become more specific. Furthermore, white boxes with large fast memories (e.g. TCAMs) cost significantly more than those with smaller memories. The purchase of white boxes to hold all prefixes is not cost effective. There is a need to identify a means to dynamically deploy and manage subsets of prefixes within white boxes containing smaller fast-memories. In some cases, current legacy vendors use proprietary and comparatively expensive router's forwarding tables/TCAMs that are sufficiently large to hold all prefixes encountered. Operators prefer simplicity (i.e. one type of memory) even if it costs much more.

Another problem is that the cost of error when configuring IP prefixes forwarding list, may be a network outage. For this reason, network operators tend to be conservative with resource allocation and over allocate resources (such as memory) to avoid network errors. Any solution that introduces resource savings must be rationalized or explained carefully such that an operator can verify it and approve it with high certainty.

SUMMARY

One general aspect includes a method including measuring usage attributes for each prefix in a set of prefixes used in traffic through a network device. The method includes identifying a subset of prefixes having a predetermined usage attribute. The method includes sending instructions to the network device to store the subset of prefixes predetermined usage attribute in a table in the network device.

Implementations may include one or more of the following features. The method including measuring the frequency of use of each prefix used in the traffic through the network device. The method including sending the instructions to a network controller in the network device to store the subset of prefixes having the predetermined usage in the table in the network device. The method including using machine learning to identify the subset of prefixes. The method wherein the usage attribute comprises frequency of prefix use. The method wherein the usage attribute comprises volume of traffic using the prefix. The method wherein the usage attribute comprises five-tuple flows.

One general aspect includes a system with a network device, a route reflector coupled to the network device, a software defined network controller coupled to the route reflector and the network device, and a prefix usage analyzer in the software defined network controller.

Implementations may include one or more of the following features. The system where the network device is a router. The system where the prefix usage analyzer includes a network traffic data collector for collecting prefixes with a predetermined usage attribute. The system where the prefix usage analyzer includes an analysis engine that identifies a subset of prefixes with a predetermined usage attribute. The system where the predetermined usage attribute is frequency of use. The system where the predetermined usage attribute is volume of traffic using the prefix. The system where the predetermined usage attribute is five-tuple flows.

One general aspect includes a tangible, non-transitory, computer readable medium having computer-executable instructions that implements a method including: measuring a usage attribute for each prefix in a set of prefixes used in traffic through a network device. The computer-executable instructions further implement a method including identifying a subset of prefixes having a predetermined usage attribute. The computer-executable instructions further implement a method including sending instructions to the network device to store the subset of prefixes in a table in the network device.

Implementations may include one or more of the following features. The tangible, non-transitory, computer readable medium that implements a method wherein measuring the usage attribute comprises measuring the frequency of use of each prefix used in the traffic through a network device. The tangible, non-transitory, computer readable medium that implements a method including sending instructions to the network device comprises sending instructions to a network controller in the network device to store the subset of prefixes having the predetermined usage attribute in the table in the network device. The tangible, non-transitory, computer readable medium that implements a method including using machine learning to identify the subset of prefixes. The tangible, non-transitory, computer readable medium that implements a method wherein the usage attribute comprises frequency of prefix use. The tangible, non-transitory, computer readable medium that implements a method wherein the usage attribute comprises volume of traffic using the prefix.

DETAILED DESCRIPTION OF ILLUSTRATIVE EMBODIMENTS

Glossary

Figure 1:
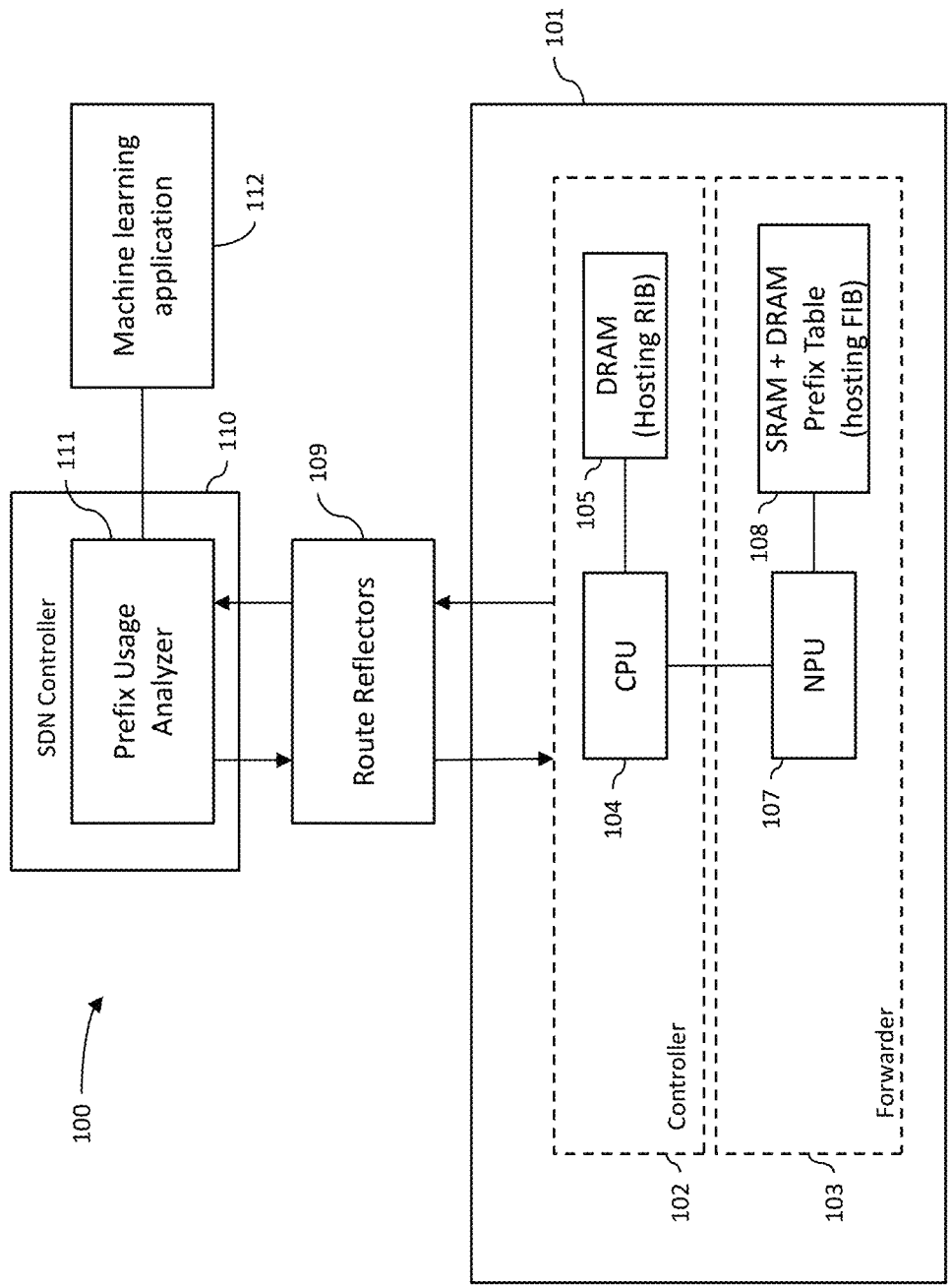
FIG. 1 is a block diagram of an architecture for a system for closed loop prefix management.

Border Gateway Protocol (BGP) is a path vector routing protocol for exchanging routing information among network elements in the same or different Autonomous System (AS). The function of a BGP-enabled network element (a BGP host or peer) is to exchange network reachability information with other BGP-enabled network elements. The most commonly implemented version of BGP is BGP-4.

5-tuple. 5-tuple refers to a set of five different values that comprise a Transmission Control Protocol/Internet Protocol (TCP/IP) connection. It includes a source IP address/port number, destination IP address/port number and the protocol in use.

IP address: An IP address is a numerical label assigned to each device (e.g., computer, printer) participating in a computer network that uses the Internet Protocol for communication.

Network prefix: A network prefix is an aggregation of IP addresses. Currently, the Internet runs two protocol versions of IP: version 4 and 6. An IP address version 4 (or short IPv4) consists of a 32-bit number and the IPv6 consists of a 128-bit number.

Route Reflector: A route reflector is a network routing component and is used to avoid the requirement of full meshing. The use of a route reflector relieves the requirement of actually fully meshing BGP peers, because the BGP RRS effectively acts as a centralization point of a number of clients to a server that chooses the best path between them and reflect the best path to other nodes. The BGP RRS also can compute a best path based on all paths that the RRS receives from internal BGP peers, and reflect the best path back to clients. The use of route reflection can reduce the total number of required connections. The routing process may direct forwarding on the basis of routing tables, which maintain a record of the routes to various network destinations. Routing tables may be specified by an administrator, learned by observing network traffic or built with the assistance of routing protocols.

Router: A router is a network device that connects devices within a network by forwarding data packets between them. This data can be sent between devices, or from devices to the internet. The router does this by assigning a local IP address to each of the devices on the network. A router is considered a layer-3 device because its primary forwarding decision is based on the information in the layer-3 IP packet, specifically the destination IP address. When a router receives a packet, it searches its routing table to find the best match between the destination IP address of the packet and one of the addresses in the routing table. Once a match is found, the packet is encapsulated in the layer-2 data link frame for the outgoing interface indicated in the table entry. A router typically only looks at the layer-3 addresses to make a forwarding decision. For pure IP forwarding, a router is designed to minimize the state information associated with individual packets. Once a packet is forwarded, the router does not retain any historical information about the packet.

SDN Controller: In a software defined network (SDN) intelligence may be logically centralized in software-based controllers (e.g. SDN controllers), which may configure network nodes (e.g. via OpenFlow protocol) and control application data traffic flow (e.g. compute optimal network paths) in the SDN network independent of network hardware. In general, software defined networks involve the use of a standalone controller that performs the control functionality for a set of network devices. As an example of software defined networking, in the case of routing, rather than routers performing individual analyses to determine routes through the network, the controller can determine the routes and program other devices in the network to behave according to the determinations made by the controller. Different protocols may be used to implement software defined networking, including open protocols like OpenFlow, and proprietary protocols from network vendors.

TCAM: TCAM (ternary content-addressable memory) is a specialized type of high-speed memory that searches its entire contents in a single clock cycle. The term "ternary" refers to the memory's ability to store and query data using three different inputs: 0, 1 and X.

Illustrated in FIG. 1 is a system architecture of a system 100 for closed loop prefix management. The system includes a network device 101 having a network device controller 102, and a network device forwarder 103. Network device controller 102 may include a central processing unit (CPU 104), and a controller memory 105 which may be a dynamic random access memory ("DRAM). Controller memory 105 contains the routing information base (RIB) also known as the IP routing table. Network device forwarder 103 may also include a network processing unit ("NPU") NPU 107 that is a programmable software device used as a network architecture component inside a network application domain. NPU 107 in the network is analogous to a CPU in a computer or similar device. Network device forwarder 103 may also include prefix table memory 108 which may comprise static random access memory ("SRAM") and DRAM and which stores a prefix table in the forwarding information base (FIB).

Network device 101 may be a provider edge device that is a device between one network service provider's area and areas administered by other network providers. Network device 101 may be a router that uses a broad range of routing protocols for example Border Gateway Protocol (BGP), open Shortest Path First (OSPF) protocol and Multiprotocol Label Switching (MPLS). Network device controller 102 controls and configures the network device forwarders 103. Network device forwarder 103 is the element that actually performs the packet forwarding. Since all the traffic goes through the network device forwarder 103, it has to support processing very high rates. For this reason the network device forwarder 103 may be equipped typically with very fast and expensive memory (such as TCAM). Although only one network device controller 102 and one network device forwarder 103 are illustrated in FIG. 1, a plurality of network device controllers and a plurality of network device forwarders may exist in the network device 101.

The system 100 may also include one or more route reflectors 109 and an SDN controller 110 with a prefix usage analyzer 111. The route reflector 109 contains all prefixes stored in the network device 101, but the route reflector does not perform the forwarding of the data packets. The task of the prefix usage analyzer 111 is to assign only prefixes having a predetermined usage attribute to the network device forwarder 103 so it could use smaller prefix table memory 108. Usage attributes may include frequency of prefix use, volume of traffic using the prefix, 5-tuple flows using the prefix, source and destination IP addresses, and time (for example time of day), among others. If a packet has a prefix that is not in the network device forwarder 103—"a miss", the network device controller 102 would fetch it from the route reflector 109. The goal is to minimize these "miss" events, hence to predict a prefix set with minimum "misses" with optimal memory size. The system 100 takes advantage of SDN automation to dynamically manage the prefix entries in the different memory levels based on network usage predictions that rely on machine learning analytics from a machine learning application 112. An important aspect of the system is that it provides analysis results that rationalize the predictions to help the operator verify automated decisions of the machine learning algorithm.

SDN controller 110 manages and deploys subsets of prefixes within white boxes (network device 101) containing smaller memory space. System 100 is a closed loop system. Closed loop refers to the fact that the system examines the traffic in the network to determine the "best prefixes" (prefixes that have a predetermined usage attribute) at any given time that is loaded in the various prefix tables of various routers, rather than loading all prefixes into all routers. Different routers will have different prefixes depending on the density of traffic predicted to be encountered at that particular router. And, a particular router's "best prefixes" may change from day to day, hour to hour depending on the time interval of our updates. There is a feedback of information from knowledge of the traffic occurring at a particular router to the prefix analyzer and then the prefix analyzer sends back the "best prefixes" that should be placed/loaded into that routers prefix table, hence, closing the loop. The prefix table memory 108 of each network device can be distinctly controlled. This allows white boxes with smaller memories and lower cost to be purchased and employed. The programmability of the SDN controller 110 and prefix usage analyzer 111 enables network operators to quickly and efficiently identify and deploy new prefix management techniques through software upgrades.

In one embodiment, the SDN controller 110 builds a prefix list based on past traffic matrix (last day, last n days, time of day, time of week) and relation between prefix groups to the autonomous system numbers (ASNs) that identifies each network and is deduced from BGP records. The construction of the prefix list can also employ other features or attributes associated with the routers and traffic e.g. router location, traffic source IP address, service type, etc.). Analysis of this data is based on machine learning technique that extracts the statistical nature of the prefixes. The prefix usage analyzer 111 in SDN controller 110 models each network device 101, hence it may assign a different prefix set to network devices in different locations. This list is built automatically and continuously updated. The system 100 may update the prefix lists once a day, but this is a configurable parameter, depending on and adjusting to the traffic changes.

An important role of the system 100 is to detect traffic anomalies. Normally there is expected to be small differences between a prefix set to a successor prefix set. A large change may indicate of an anomaly, for example some directed denial of service (DDoS) attack that causes a surge of traffic over certain prefixes, some flash crowd or a network failure somewhere in the Internet. Detecting these anomalies is crucial to explain to operators expected network problems. It is also important to determine whether to consider the anomaly time window for next period prediction or just ignore it as it will create noise.

Figure 2:
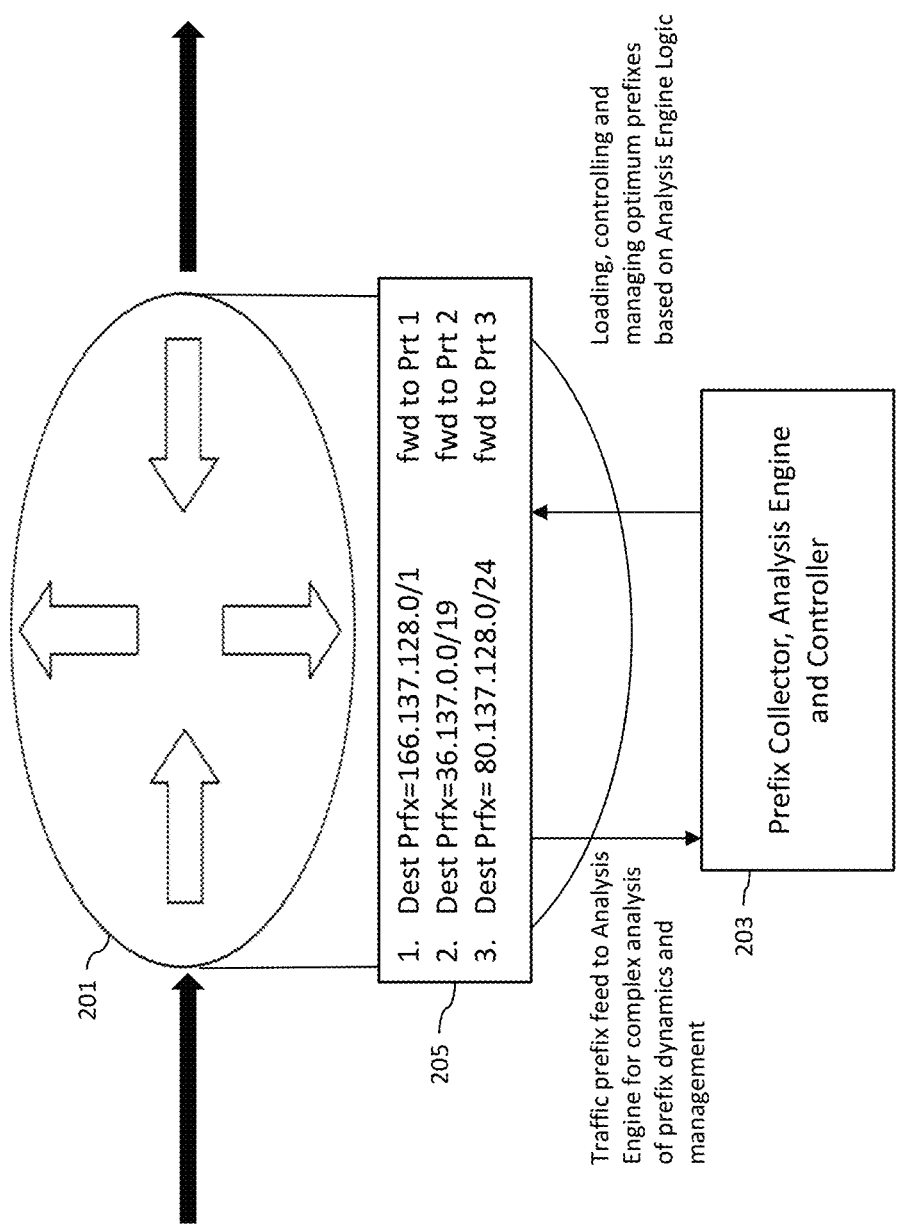
FIG. 2 illustrates a router and an associated prefix collector, analysis engine and controller according to an embodiment of the disclosure.

FIG. 2 is a high level illustration of a router 201 including a prefix collector, traffic analysis engine and controller 203. Forwarding table 205 in router 210 may include a plurality of destination prefixes (traffic prefixes) which feed to the analysis engine for complex analysis of prefix dynamics and management. Prefix collector, analysis engine and controller 203 provides for the loading, controlling and managing of optimum prefixes with a predetermined usage attribute based on analysis engine logic.

Figure 3:
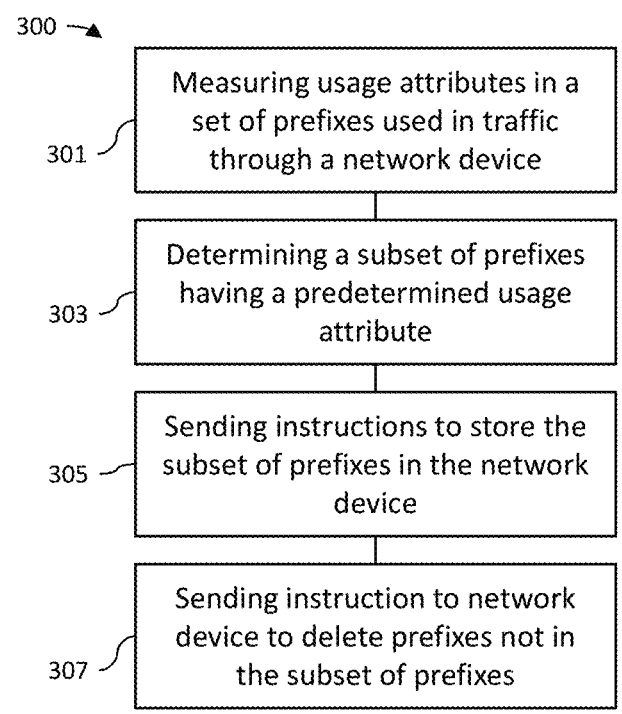
FIG. 3 is a flow chart of a method for allocating prefixes in a network device.

FIG. 3 illustrates an embodiment of a method 300 for closed loop prefix management and controller for white boxes.

In step 301, the method 300 measures a usage attribute of each prefix in a set of prefixes.

In step 303, the method 300 determines or identifies a subset of prefixes having a predetermined usage attribute using the prefix usage analyzer 111.

In step 305, the method 300 sends instruction to the network device to store the subset of prefixes in the routing table.

In step 307, the method 300 may send instructions to the network device to delete prefixes not in the subset of prefixes.

Figure 4:
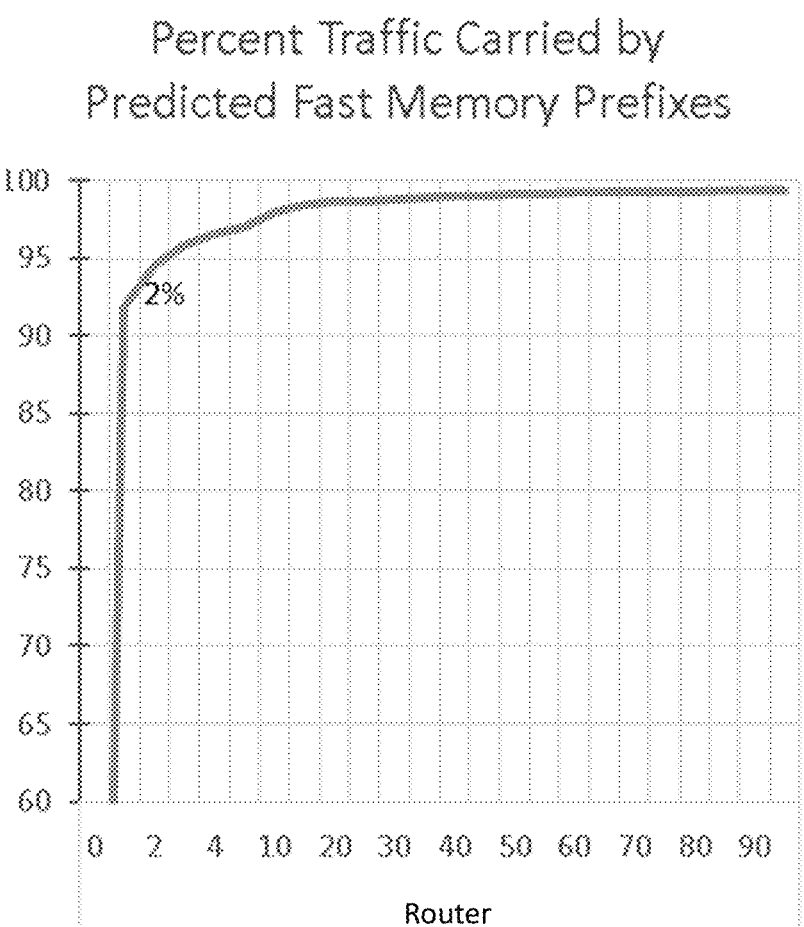
FIG. 4 is a chart that illustrates amount of traffic carried in a given router when predicting the fast memory prefixes over a 30 day period.

FIG. 4 illustrates amount of traffic carried in a given router when predicting the fast memory prefixes over a 30 day period. The estimated fast memory prefix list is based on top most used prefixes from previous 3 days. The figure shows that when using 2% of the prior 3 days of top most used prefixes 95% of the current day's router traffic is captured (i.e. un-missed).

Figure 5:
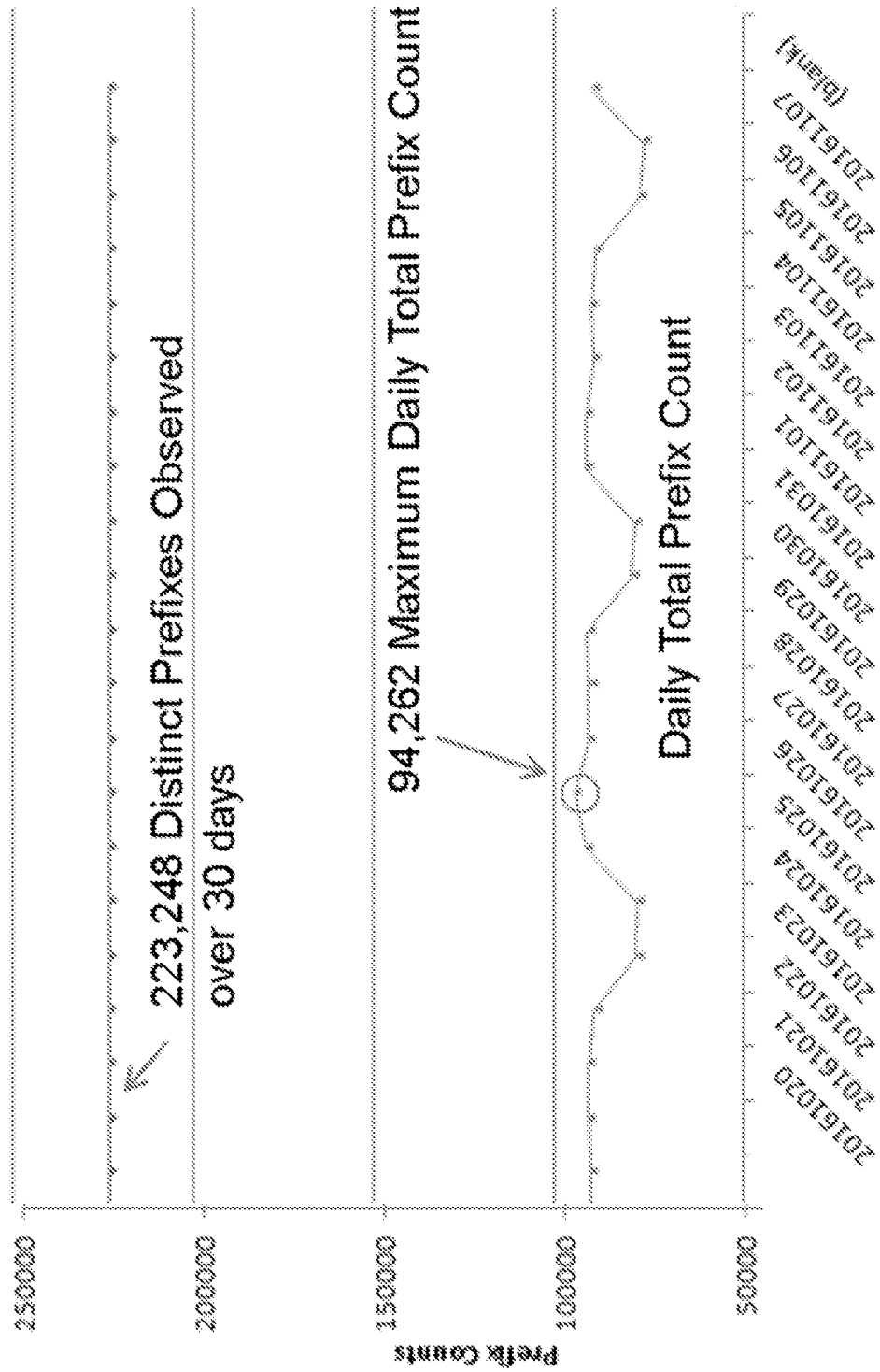
FIG. 5 is a chart illustrating the prefixes that were observed on a specific network router; compared to the number of prefixes that were specifically observed on any given day within that period of time.

FIG. 5 illustrates that over a 30 day period over 220K prefixes were observed on a specific network router; but, on any given day within that period of time not more than 95,000 prefixes where specifically observed. The system 100 may provide significant savings in forward table memory requirement (e.g. in this illustration 58% less memory would be required).

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method comprising:
measuring, by a processing system including a processor, a usage attribute for each prefix in a set of prefixes used in traffic through a network device to obtain network usage information, wherein the usage attribute is either a volume of traffic using each prefix or a frequency of use for each prefix;
analyzing, by the processing system, the network usage information to generate a network usage prediction;
predicting, by the processing system in accordance with the network usage prediction, a subset of the set of prefixes having a predetermined usage attribute to generate a prefix list for use during a first predetermined time period;
sending, by the processing system, instructions to the network device to store the prefix list with the predetermined usage attribute in a table in the network device, resulting in the table including less than the set of prefixes and using a reduced table memory;
updating, by the processing system, the prefix list to generate an updated prefix list for use during a second predetermined time period subsequent to the first predetermined time period; and
detecting, by the processing system, a network traffic anomaly in accordance with a difference between the prefix list and the updated prefix list being greater than an expected difference between the prefix list and the updated prefix list.

2. The method of claim 1, wherein the measuring the usage attribute comprises measuring a frequency of use of each prefix used in the traffic through the network device.

3. The method of claim 1, wherein the sending instructions to the network device comprises sending the instructions to a network controller in the network device to store the prefix list.

4. The method of claim 1, wherein the predicting the subset of prefixes comprises using machine learning analytics based on a machine learning algorithm.

5. A system comprising:
a network device;
a route reflector coupled to the network device;
a software defined network controller coupled to the route reflector and the network device; and
a prefix usage analyzer in the software defined network controller, wherein the prefix usage analyzer measures a volume of traffic using each prefix of a set of prefixes or a frequency of use for each prefix of the set of prefixes to obtain network usage information, analyzes the network usage information to generate a network usage prediction, and predicts, in accordance with the network usage prediction, a subset of prefixes of the set of prefixes for use during a first predetermined time period,
wherein each prefix of the subset of prefixes has a predetermined usage attribute, and wherein the subset of prefixes comprises a prefix list for storage in a table in the network device, resulting in the table including less than the set of prefixes and using a reduced table memory, and
wherein the prefix usage analyzer updates the prefix list to generate an updated prefix list for use during a second predetermined time period subsequent to the first predetermined time period, and detects a network traffic anomaly in accordance with a difference between the prefix list and the updated prefix list being greater than an expected difference between the prefix list and the updated prefix list.

6. The system of claim 5 wherein the network device is a router.

7. The system of claim 5 wherein the prefix usage analyzer comprises a collector for collecting prefixes with the predetermined usage attribute.

8. The system of claim 5, wherein the prefix usage analyzer measures a frequency of use of each prefix used in the traffic through the network device.

9. A non-transitory machine-readable medium comprising executable instructions that, when executed by a processing system including a processor, facilitate performance of operations comprising:
measuring a usage attribute for each prefix in a set of prefixes used in traffic through a network device to obtain network usage information;
analyzing the network usage information to generate a network usage prediction;
predicting, in accordance with the network usage prediction, a subset of prefixes of the set of prefixes having a predetermined usage attribute to generate a prefix list for use during a first predetermined time period;
sending instructions to the network device to store the prefix list in a table in the network device, resulting in the table including less than the set of prefixes and using a reduced table memory, wherein the usage attribute comprises either a volume of traffic using each prefix of the set of prefixes or a frequency of use for each prefix of the set of prefixes;
updating the prefix list to generate an updated prefix list for use during a second predetermined time period subsequent to the first predetermined time period; and
detecting a network traffic anomaly in accordance with a difference between the prefix list and the updated prefix list being greater than an expected difference between the prefix list and the updated prefix list.

10. The non-transitory machine-readable medium of claim 9 wherein the measuring the usage attribute comprises measuring a frequency of use of each prefix used in the traffic through the network device.

11. The non-transitory machine-readable medium of claim 9 wherein the sending instructions to the network device comprises sending instructions to a network controller in the network device to store the prefix list.

12. The non-transitory machine-readable medium of claim 9 wherein the predicting the subset of prefixes comprises using machine learning analytics based on a machine learning algorithm.

13. The method of claim 4, further comprising providing, by the processing system, analysis results regarding the predicting for use by a user of the processing system to verify automated decisions of the machine learning algorithm.

14. The method of claim 1, wherein the network traffic anomaly comprises a directed denial of service attack.

15. The method of claim 1, wherein the second predetermined time period is successive to the first predetermined time period.

16. The system of claim 5, wherein the prefix usage analyzer predicts the subset of prefixes using machine learning analytics based on a machine learning algorithm.

17. The system of claim 16, wherein the prefix usage analyzer provides analysis results regarding the subset of prefixes for use by a user of the system to verify automated decisions of the machine learning algorithm.

18. The system of claim 5, wherein the second predetermined time period is successive to the first predetermined time period.

19. The non-transitory machine-readable medium of claim 9, wherein the operations further comprise providing analysis results regarding the predicting for use by a user of the processing system to verify automated decisions of a machine learning algorithm.

20. The non-transitory machine-readable medium of claim 9, wherein the second predetermined time period is successive to the first predetermined time period.

* * * * *